United States Patent [19]

Neese

[11] 4,092,786

[45] June 6, 1978

[54] EDUCATIONAL DEVICE

[76] Inventor: Susan Lynne Nirmaier Neese, 598 Angell St., Providence, R.I. 02906

[21] Appl. No.: 678,421

[22] Filed: Apr. 19, 1976

[51] Int. Cl.² .......................................... G09B 19/00
[52] U.S. Cl. ...................................... 35/8 R; D19/59
[58] Field of Search .................. 35/1, 8 R, 35 E, 51, 35/53, 54, 17; 281/15 R, 15 A; 273/155; D19/59, 62; 40/104.02; 352/99; 52/182

[56] References Cited

U.S. PATENT DOCUMENTS

| D. 142,669 | 10/1945 | Rogow | 35/1 X |
|---|---|---|---|
| 258,164 | 5/1882 | Hoevenbergh | 352/99 |
| 1,326,832 | 12/1919 | Baily | 40/104.02 |
| 2,180,653 | 11/1939 | Yancey | 35/8 R |
| 2,275,956 | 3/1942 | Grace | 35/8 R |
| 2,490,342 | 12/1949 | Essington | 35/8 R |
| 2,812,183 | 11/1957 | Schiff | 273/155 |
| 3,055,118 | 9/1962 | Betancourt | 35/35 E X |
| 3,740,128 | 6/1973 | Adler | 352/99 |

Primary Examiner—Harland S. Skogquist
Attorney, Agent, or Firm—Salter & Michaelson

[57] ABSTRACT

An educational device simulating a shoe, including a plurality of plates that are located in vertically stacked relation, each of the plates being hingedly connected to an adjacent plate and being pivotal about a horizontal axis to selectively expose the interior surfaces thereof as each plate is pivotally moved relative to the others.

1 Claim, 5 Drawing Figures

EDUCATIONAL DEVICE

BACKGROUND OF THE INVENTION

The present invention relates to an educational device and includes a plurality of movable plates that simulate a shoe to provide not only play value, but is also educational in purpose in teaching the lacing and tying of shoelaces.

Educational devices that also have play value are commonly available for use and instruction of children, and these prior known devices have taken various forms, depending upon the purpose in the teaching aspect thereof. Prior to the instant invention, some efforts have been made to provide educational devices that incorporate the configuration of a shoe, wherein the simulated shoe also included a provision for teaching the lacing and tying of shoelaces on the shoe, thereby enabling a child to conveniently practice the technique of shoelace tying at a relatively early age. Such an educational device as known heretofore is illustrated by way of example in U.S. Pat. No. Des. 142,670; and, as shown in this patent, a book comprising front and back covers and a plurality of pages are formed in a design that simulates a shoe. However, the play value of this prior known educational device and others similar thereto had limited interest for the child and was constructed in such a way as to be easily abused by a child in the use thereof.

Although the prior known educational devices did have some educational and play value and in some instances accomplished the purpose intended, they were usually not constructed or formed in a way to retain the interest of a child; and, since such articles did not impart a realistic effect to the article being portrayed, the child usually quickly lost interest after a short period of use and play thereof.

SUMMARY OF THE INVENTION

The present invention embodies an educational device and avoids the attendant problems associated with prior known educational devices of the type embodied herein, and comprises a plurality of plates that are located one on top of the other in vertically stacked relation, the overall configuration of the stacked plates simulating a shoe. Each of the plates is hingedly connected to an adjacent plate at an end thereof, wherein each of the plates is hingedly movable about a horizontal axis to selectively expose the interior surfaces of the plates as each is pivotally moved relative to the others. The interior surface of the plates may be provided with interesting designs or writing to portray a story, and the plates of the simulated shoe are also formed in a way to accommodate a cord that enables the user to effect the lacing and tying of a shoelace.

Accordingly, it is an object of the present invention to provide an educational device that comprises a plurality of plates that are located in stacked relation and that are hinged, one with respect to the other, the vertically stacked plates being arranged in stepped relation to simulate a shoe.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
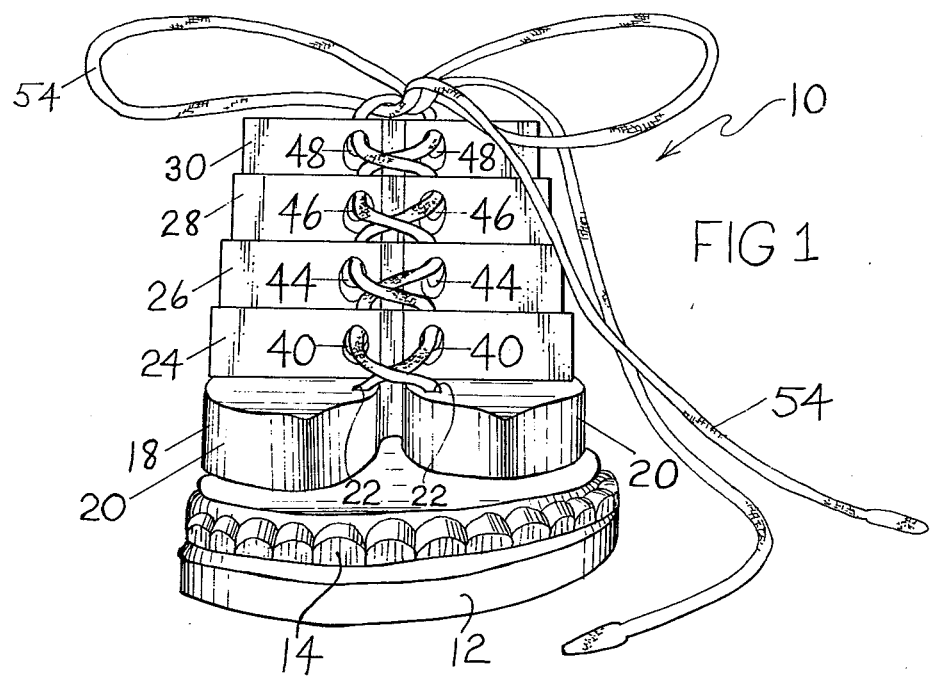
FIG. 1 is a front elevational view of the educational device embodied in the present invention.

Referring now to the drawings, the educational device embodied in the present invention is illustrated and is generally indicated at 10. The educational device 10 as shown simulates a shoe of the high-top variety and includes a plurality of plates that are arranged in vertically stacked relation and in the longitudinal dimension thereof decrease in size in ascending order. The lowermost plate of the stack includes a base plate 12 that has the shape and configuration of the sole of a shoe and that is formed with an ornamental design on a forward peripheral edge 14 thereof. Joined to the base plate 12 at the rearmost end thereof by a hinge 16 is a plate 18, the forwardmost edges thereof being rearwardly spaced from the forward edge 14 of the base plate 12. For ornamental purposes, the plate 18 is formed with spaced tapered portions 20 thereon, each of the tapered portions 20 having an opening 22 formed therein for receiving a shoelace as will be described.

Figure 2:
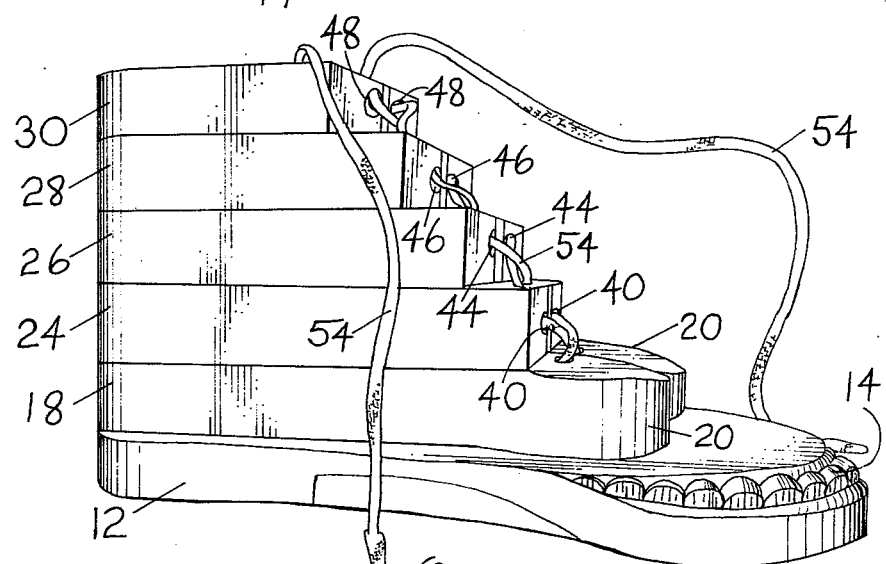
FIG. 2 is a side perspective view thereof.
Figure 3:
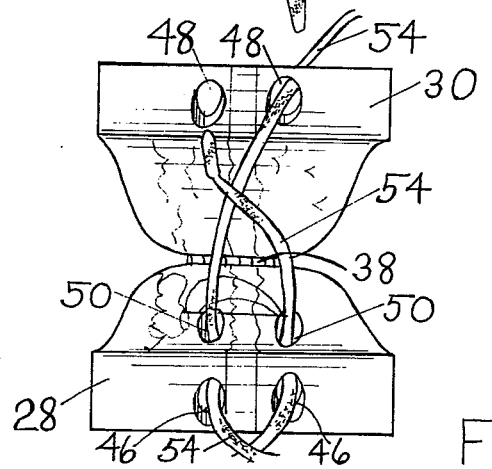
FIG. 3 is a front elevational view of two of the pivoted plates as located in an open position with respect to each other.
Figure 4:
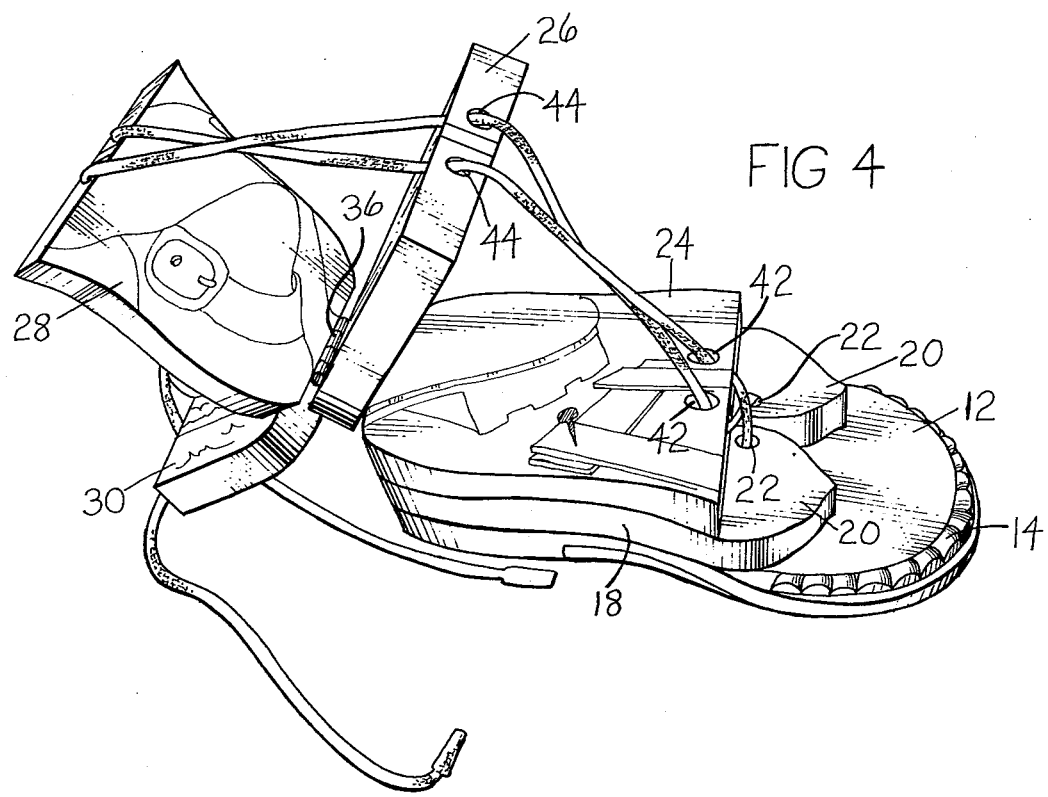
FIG. 4 is a perspective view showing several of the plates pivoted to an open position thereof.
Figure 5:
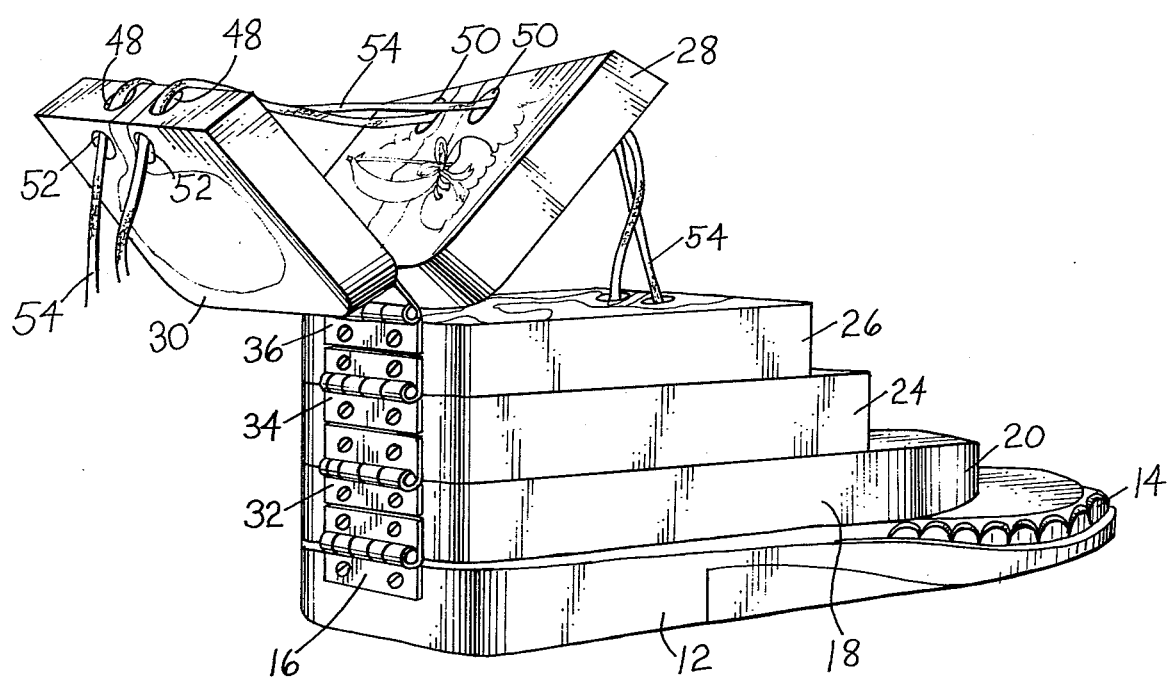
FIG. 5 is a rear perspective view of the educational device, illustrating the top two plates as pivoted to the open position.

Mounted in stacked relation on the plates 18 and 12 are a plurality of plates 24, 26, 28 and 30, all of which are formed in a similar manner but differing in the longitudinal dimension thereof, wherein the longitudinal dimension decreases in the ascending order of the plates, thereby producing a stacked effect as more clearly illustrated in FIG. 2. However, the rearmost ends of the plates that define the heel and the side edges thereof are all located in aligned relation. Each plate is hingedly connected to the adjacent plates by a hinge having opposed hinge leaves joined by a hinge pin; and, as shown in FIG. 5, the plate 24 is hinged to plate 18 by a hinge 32 and to the plate 26 by a hinge 34. Similarly, the plate 26 is hinged to the plate 24 by the hinge 34 and is hinged to the plate 28 by a hinge 36. The top plate 30 is hinged to the plate 28 by a hinge 38, the hinge-knuckles of which are illustrated in FIG. 3. Each of the hinges are joined to the heel ends of the plates by conventional screws that secure the various hinge leaves in place on the heel ends of the movable plates. It is seen that each of the plates is hingedly movable relative to an adjacent plate along the hinge axis thereof as provided for by the individual hinges.

The configuration of the base plate 12 and the varying longitudinal dimension of the plates 18–30, which produces the stepped effect, also lends the appearance of a shoe, the stepped portion defining the vamp of the shoe. Obviously, the aligned rearmost ends of the plates and to which the hinges are secured define the heel end of the shoe.

In order to provide additional play value for the educational device 10, each of the plates has a design formed or imprinted on the opposite faces thereof, the design either depicting or portraying a story, and including ornamental and interesting shapes and figures, including cartoon figures, that lend interest to the description of the story being portrayed. Thus, the movable plates as they appear in stacked relation can be pivotally moved one after the other to portray a particular story line as depicted on each of the surfaces of the plates. It is understood that any story may be portrayed or depicted in an interesting and ornamental manner that would add to the play value of the device.

Another feature of the invention is the addition of a shoelace that is insertable into suitable openings in the plates so that the child that uses the device may simulate tying a shoelace that further adds interest to the device. In this connection, the plate 24 is formed with spaced openings 40 in the forward end face thereof. Also formed on the top surface of the plate 24 are spaced openings 42 that communicate with the openings 40 and provide through passages through the plate 24. Similarly, openings 44 are formed in the forward end face of the plate 26, the openings 44 communicating with openings formed on the upper face of the plate 26 and defining through passages therewith. As shown in FIG. 1, corresponding spaced openings 46 are formed in the plate 28 and openings 48 are formed in the forward end face of the plate 30, each set of these openings communicating with openings 50 and 52 formed in the upper faces of the plates 28 and 30, respectively.

A shoelace 54 is inserted through the various openings as formed in the plates and preferably extends through suitable openings formed in the base plate 12 so as to provide for continuous threading of the ends of the shoelace 54 through the various openings of the plates as illustrated. It is seen that the shoelace 54 may be conveniently threaded through the various openings in the plates that are formed along the simulated shoe vamp and provide an educational and teaching aid for instructing a child in the method of tying a shoelace. The child can thus not only become accustomed to the actual tying operation, but is also taught the manner in which the ends of the shoelaces are threaded through the openings in the simulated vamp.

As illustrated and described, the educational device as shown provides interesting play value since the child may not only use the plates to be entertained by the pictures and story portrayed on the surfaces thereof, but will find that the pivotal movement of the plates provides an interesting effect that enhances the story or ornamental designs as depicted on the surfaces of the plates. Further, the child using the device has free access to the shoelace 54 and may be taught to thread the ends of the shoelace through the various openings in the plates to simulate the threading of a shoelace through eyelets of an actual shoe and to further simulate the action of tying a shoelace on the vamp of a shoe.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An educational device comprising a plurality of plates that are located one on top of the other in vertically stacked relation, the overall configuration of the stacked plates simulating a shoe, each of said plates being hingedly connected to an adjacent plate at an end thereof, wherein each of the plates is hingedly movable about a horizontal axis to selectively expose the interior surfaces of the plates as each is pivotally moved relative to the others, the bottommost of said plates defining a base and forming the sole of the simulated shoe, the forward portions of the plates above said base plate being located in stepped vertical relation to simulate the vamp of the shoe, each of the plates that define the vamp having pairs of spaced openings formed in the forward portion thereof through which a cord extends for simulating a shoestring, the plates located above the one in contact with the base plate having the openings formed in the forward edges thereof and in the uppermost face, wherein the cord is extendible therethrough for simulating the lacing of the shoestring when the plates are located in stacked relation.

* * * * *